United States Patent Office

3,432,597
Patented Mar. 11, 1969

3,432,597
HYDROGENATED MOENOMYCIN AND PROCESS OF PREPARATION
Ulrich Schacht, Hofheim, Taunus, Germany, assignor to Farbwerke Hoechst Aktiengesellschaft vormals Meister Lucius & Brüning, Frankfurt am Main, Germany, a corporation of Germany
No Drawing. Filed Aug. 18, 1966, Ser. No. 573,216
Claims priority, application Germany, Sept. 3, 1965,
F 47,079/65
U.S. Cl. 424—118                7 Claims
Int. Cl. A61k 21/00; C07g 11/00

ABSTRACT OF THE DISCLOSURE

Hydro-moenomycin complex, hydro-moenomycin A, hydro-moenomycin B, hydro-moenomycin C, and a process for their preparation by the catalytic hydrogenation of moenomycin precursors.

---

Moenomycin is an antibiotic isolated from *Streptomyces bambergiensis* ATCC 13879 and a number of other equivalent microorganisms; the preparations and production of this antibiotic is described in German patent specification No. 1,113,791. The antibiotic is active mainly against gram-positive bacteria; the degree of activity in vitro is of about the same order as that of penicilline and tetracycline. Moenomycin (moenomycin complex) consists of a mixture of several components of closely related chemical properties and antibiotic activities.

The complex can be separated into three components, moenomycin A, moenomycin B, and moenomycin C, by column chromatography on silica gel, as disclosed in copending patent application Ser. No. 510,689, filed Nov. 30, 1965.

Now I have found that by catalytic hydrogenation of moenomycin complex or the components A, B, and C, products are obtained which in comparison with the native product have an increased antibiotic action against gram-positive pathogenic bacteria. The hydrogenation is carried out with the aid of precious metal catalysts, preferably platinum, or with Raney nickel, in polar solvents such as water, glacial acetic acid, low molecular weight alcohols or dimethyl formamide. The quantity of hydrogen reacted can be measured in a gas burette which serves as servoir. After separation of the catalyst, the hydrogenated product can be isolated from the reaction solution by evaporating the solvent in vacuo or precipitating the product with ether. For further purification it is dissolved in a small quantity of methanol, filtered with suction, precipitated by addition of ether and separated by centrifugation. If required, the hydrogenated complex can be separated into the hydrogenated single components A, B and C according to the process for separating moenomycin described in the aforesaid copending U.S. patent application. The hydrogenated moenomycin and the hydrogenated single components are characterized by the following physical data:

HYDRO-MOENOMYCIN A

Elementary analysis ($NH_4$-salt) (C, H, O, N, P): C, 46.9%; H, 7.8%; N, 6.1%; P, 1.8%.
Melting point: 180–182° C. (decomposition).
UV-spectrum in phosphate buffer (pH 7.0): maximum absorption at 258 m$\mu$ ($E_{1\,cm.}^{1\%}$=112), minimum absorption at 226 m$\mu$ ($E_{1\,cm.}^{1\%}$=28)

UV-spectrum in 0.1 N HCl: maximum absorption at 247 m$\mu$ ($E_{1\,cm.}^{1\%}$=82), minimum absorption at 223 m$\mu$ ($E_{1\,cm.}^{1\%}$=40)

IR-spectrum (in KBr): The $NH_4$-salt has bands at 2.95; 3.39; 3.42; 3.50; 5.82; 6.05; 6.16; 6.57; 7.15; 7.30; 7.57; 8.20; 9.50; 10.42; 11.80 and 13.00$\mu$.
Thin-layer chromatography on silica gel G: $R_f$ 0.45 (isopropanol/2 N $NH_3$ 70:30 system) and $R_f$ 0.70 (ethanol/water 40:10 system).

HYDRO-MOENOMYCIN B

Elementary analysis ($NH_4$-salt) (C, H, O, N, P): C, 43.6%; H, 6.9%; N, 6.4%; P, 1.8%.
Melting point: 180–182° C. (decomposition).
No UV-absorption.
IR-spectrum (in KBr): The $NH_4$-salt has bands at 2.95; 3.39; 3.42; 3.50; 5.83; 6.00; 6.28; 7.18; 7.27; 7.55; 8.19; 9.50; 10.50; 11.18; 11.80 and 12.40$\mu$.
Thin-layer chromatography on silica gel G: $R_f$-values 0.36 (isopropanol/2 N $H_3$ 70:30 system) and 0.44 (ethanol/water 40:10 system).

HYDRO-MOENOMYCIN COMPLEX

Elementary analysis ($NH_4$-salt) (C, H, O, N, P): C, 44.8%; H, 7.0%; N, 6.3%; P, 1.8%.
Melting point: 178–180° C. (decomposition).
UV-spectrum in phosphate buffer (pH 7.0) maximum absorption at 258 m$\mu$ ($E_{1\,cm.}^{1\%}$=64), minimum absorption at 230 m$\mu$ ($E_{1\,cm.}^{1\%}$=25)

UV-spectrum in 0.1 N HCl: maximum absorption at 258 m$\mu$ ($E_{1\,cm.}^{1\%}$=56), minimum absorption at 223 m$\mu$ ($E_{1\,cm.}^{1\%}$=30)

IR-spectrum (in KBr): the $NH_4$-salt has bands at 2.95; 3.39; 3.42; 3.50; 5.82; 6.07; 6.50; 7.19; 7.30; 7.60; 8.17; 9.55; 10.42; 11.80 and 13.20$\mu$.

The improved antibiotic action of the products of the invention was determined by a test with *Staphylococcus aureus* P209. If the inhibiting effect of moenomycin component A, disclosed in compending U.S. patent application Ser. No. 510,689, against *Staphylococcus aureus* P209 is presumed to be 1, the inhibiting effect of the completely hydrogenated component A, under equal conditions, is 2.0. Partially hydrogenated products have a slightly minor activity increase. Completely hydrogenated moenomycin B has an inhibiting effect of 1.7. That of the completely hydrogenated moenomycin complex is 1.4 (referred to non-hydrogenated moenomycin A=1).

The following table lists the activity increases after hydrogenation with platinum in acetic acid:
Relative inhibiting value (moneomycin A=1):

Hydro-moenomycin A _____ 2.0
Moenomycin B _____ 1.1
Hydro-moenomycin B _____ 1.7
Moenomycin complex _____ 0.8
Hydro-moenomycin complex _____ 1.4

The following examples serve to illustrate the invention but they are not intended to limit it thereto.

Example 1

20 mg. of platinum oxide are suspended in 10 ml. of acetic acid and reduced to metallic platinum in a hydrogenation apparatus. 100 mg. of moenomycin A are then added under a hydrogen atmosphere and hydrogenated at room temperature while stirring with a magnetic stirrer. The hydrogen absorption which at the beginning of the reaction is rather fast, slows gradually down and ends after approximately 3 days; within that period of time a total of 8.85 ml. of $H_2$ (0° C., 760 mm. Hg) is consumed. After filtering off the catalyst the acetic acid is evaporated in vacuo, the residue is dissolved in 10 ml. of methanol, filtered again, and the hydrogenation product is separated from the solution by precipitation with ether and centrifugation.

Example 2

100 mg. of moenomycin complex (consisting of approximately 60% of moenomycin A, 30% of moenomycin B and 10% of moenomycin C) are dissolved in 10 ml. of methanol and hydrogenated in the presence of the platinum catalyst described in Example 1 at 0° C., 760 mm. Hg. After 24 hours 10.5 ml. of hydrogen are absorbed. The hydrogenation product is isolated by filtration of the catalyst, precipitation with ether and centrifugation.

I claim:

1. A process for the preparation of a member selected from the group consisting of hydro-moenomycin complex, hydro-moenomycin A, hydro-moenomycin B, and hydro-moenomycin C which comprises respectively catalytically hydrogenating a member selected from the group consisting of moenomycin complex, moenomycin A, moenomycin B, and moenomycin C in the presence of a precious metal catalyst or Raney nickel.

2. A process as in claim 1 wherein said catalyst is platinum metal.

3. A process as in claim 1 wherein said catalyst is Raney nickel.

4. Hydro-moenomycin complex prepared by hydrogenating moenomycin complex according to the process of claim 1.

5. Hydro-moenomycin A prepared by hydrogenating moenomycin A according to the process of claim 1.

6. Hydro-moenomycin B prepared by hydrogenating moenomycin B according to the process of claim 1.

7. An antibiotic pharmaceutical preparation comprising a carrier and a member selected from the group consisting of hydro-moenomycin complex, hydro-moenomycin A, hydro-moenomycin B, or hydro-moenomycin C prepared according to the process of claim 1.

References Cited

FOREIGN PATENTS 6,611,906   3/1967   Netherlands.

ALBERT T. MEYERS, *Primary Examiner.*

S. ROSEN, *Assistant Examiner.*